US007340273B2

(12) United States Patent
Ono

(10) Patent No.: US 7,340,273 B2
(45) Date of Patent: Mar. 4, 2008

(54) PORTABLE COMMUNICATION TERMINAL WITH IMPROVED LIGHT EMISSION STRUCTURE

(75) Inventor: Shuichi Ono, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/074,829

(22) Filed: Mar. 9, 2005

(65) Prior Publication Data

US 2005/0227738 A1 Oct. 13, 2005

(30) Foreign Application Priority Data

Mar. 9, 2004 (JP) ............................ 2004-064982

(51) Int. Cl.
*H04M 1/00* (2006.01)
*H04B 1/38* (2006.01)
*H01H 9/00* (2006.01)

(52) U.S. Cl. .................. 455/550.1; 455/90.2; 200/314

(58) Field of Classification Search ................ 200/314, 200/305; 455/550.1, 90.2
See application file for complete search history.

(56) References Cited

U.S. PATENT DOCUMENTS

| | | | | |
|---|---|---|---|---|
| 5,661,279 | A * | 8/1997 | Kenmochi | 200/314 |
| 5,711,588 | A * | 1/1998 | Rudisill | 362/30 |
| 6,127,933 | A * | 10/2000 | Ohmura et al. | 340/636.1 |
| 6,919,524 | B2 * | 7/2005 | Imamura et al. | 200/512 |

FOREIGN PATENT DOCUMENTS

| | | | |
|---|---|---|---|
| JP | 5-31039 | | 4/1993 |
| JP | 6-275169 | | 9/1994 |
| JP | 9-92073 | | 4/1997 |
| JP | 11-213793 | | 8/1999 |
| JP | 2005-100674 | * | 4/2005 |

* cited by examiner

*Primary Examiner*—Nick Corsaro
*Assistant Examiner*—Ibrahim A. Khan
(74) *Attorney, Agent, or Firm*—Young & Thompson

(57) ABSTRACT

A portable communication terminal includes a front case, a plurality of operation buttons, a rubber sheet, and a light-emitting diode. The front case has a plurality of openings. The plurality of operation buttons are placed in the respective openings to operate the portable communication terminal. The rubber sheet fixes the operation buttons from a lower side. The light-emitting diode illuminates the operation buttons. A rib is formed on a lower surface of a casing portion between the openings of the front case. The rubber sheet is interposed between the rib and light-emitting diode.

12 Claims, 7 Drawing Sheets

PORTABLE COMMUNICATION TERMINAL WITH IMPROVED LIGHT EMISSION STRUCTURE

BACKGROUND OF THE INVENTION

The present invention relates to a portable communication terminal and, more particularly, to a portable communication terminal having a light emission unit for operation buttons which use light-emitting diodes.

In general, a portable communication terminal represented by a portable telephone has built-in light-emitting diodes (to be referred to as "LEDs" hereinafter) to illuminate operation buttons so that the buttons can be operated even in the darkness.

Light emission of the LEDs of an electronic device in a general portable communication terminal will be described with reference to FIGS. 6A to 6C and FIG. 7.

FIGS. 6A to 6C and FIG. 7 schematically show a conventional electronic device. An electronic device 101 includes a front case 102 and rear case 103.

The front case 102 is a case that forms the surface front side of the electronic device 101, and the rear case 103 is a case that forms the rear surface side of the electronic device 101. The front case 102 has an operating portion 104 and display 105.

The front case 102 has a plurality of openings 102*c* to place operation buttons 106. The portions between the openings 102*c* are narrow, and the front case 102 is thin, leading to a low rigidity.

The operation buttons 106 are the components for operating the electronic device 101, and are arranged such that their heads project from the corresponding openings 102*c*.

A rubber sheet 107 is adhered to the lower surfaces of the operation buttons 106 in the electronic device 101. When an operation button 106 is pressed, the corresponding portion of the rubber sheet 107 is also pressed together with the operation button 106. Those portions of the rubber sheet 107 which are immediately under the operation buttons 106 have downward projections 107*a*. The projections 107*a* abut against metal dome contacts 109 through a light-diffusing sheet 108. The side edges of the rubber sheet 107 are sandwiched by the front case 102 and a substrate 111.

LEDs 110 are placed between metal domes on the substrate 111.

In general, when the power supply of a portable communication terminal is turned on, the LEDs of the light emission structure described above emit light. For example, in the case of a folding portable telephone, when the portable telephone is opened, the power supply is turned on and the LEDs emit light.

Light from the LEDs 110 is transmitted through the rubber sheet 107 directly or after being reflected by the light-diffusing sheet 108 to propagate to the operation buttons 106. Thus, the respective operation buttons 106 are illuminated.

In a portable terminal represented by such a portable telephone, the weight of the casing portion has been decreased and the internal structure has been improved largely to achieve downsizing and weight reduction (for example, Japanese Patent Laid-Open No. 11-213793 (FIG. 1), Japanese Patent Laid-Open No. 6-275169 (FIG. 1), and Japanese Utility Model Laid-Open No. 5-031039 (FIG. 1).

Hence, the portable communication terminal has achieved downsizing and weight reduction.

As the portable communication terminal is downsized and reduced in weight, however, the operation buttons 106 also become small and are arranged close to each other on the front surface side of the front case. Accordingly, sometimes the operator may erroneously press a casing portion 102*a* in the vicinity of an operation button.

At this time, as the casing portion 102*a* in the vicinity of the pressed operation button has a low rigidity, when the casing portion 102*a* is pressed, it is bent and the corresponding operation button 106 is also pressed. As a result, the portable communication terminal may operate erroneously.

From the viewpoint of weight reduction and power consumption reduction of the portable communication terminal, to decrease the number of LEDs of the light emission structure used in the electronic device is sought for. When, however, the number of LEDs used in the electronic device is decreased, although the operation buttons 106 placed near the LEDs 110 are illuminated brightly, the operation buttons 106 placed far from the LEDs 110 are illuminated only dimly. Thus, a difference in emitted light brightness occurs among the operation buttons to cause so-called light non-uniformity.

SUMMARY OF THE INVENTION

It is the principal object of the present invention to provide a portable communication terminal having a light emission structure that does not operate erroneously even when a casing portion in the vicinity of an operation button is pressed erroneously.

It is another object of the present invention to provide a portable communication terminal having a light emission structure which illuminates operation buttons with a uniform brightness when an operation button is pressed correctly.

In order to achieve the above objects, according to the present invention, there is provided a portable communication terminal comprising a front case having a plurality of openings, a plurality of operation buttons which are placed in the respective openings to operate the portable communication terminal, a rubber sheet which fixes the operation buttons from a lower side, and a light-emitting diode which illuminates the operation buttons, wherein a rib is formed on a lower surface of a casing portion between the openings of the front case, the rubber sheet being interposed between the rib and light-emitting diode.

DETAILED DESCRIPTION OF THE EMBODIMENTS

The preferred embodiments of a portable communication terminal according to the present invention will be described by way of an electronic device in a portable communication terminal with reference to the accompanying drawings.

First Embodiment

First, a portable communication terminal according to the first embodiment of the present invention will be described with reference to FIGS. 1 to 3C.

Figure 1:
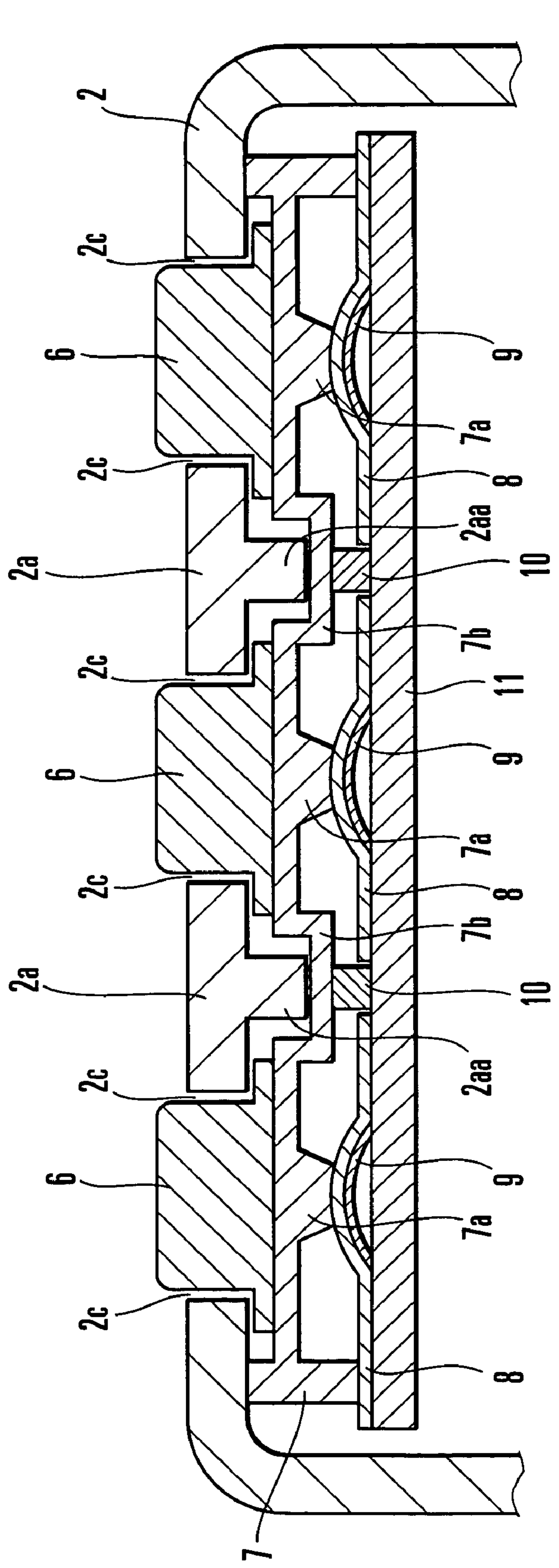
FIG. 1 is a sectional view of a portion near an operation button portion of an electronic device according to the first embodiment of the present invention.
Figure 2:
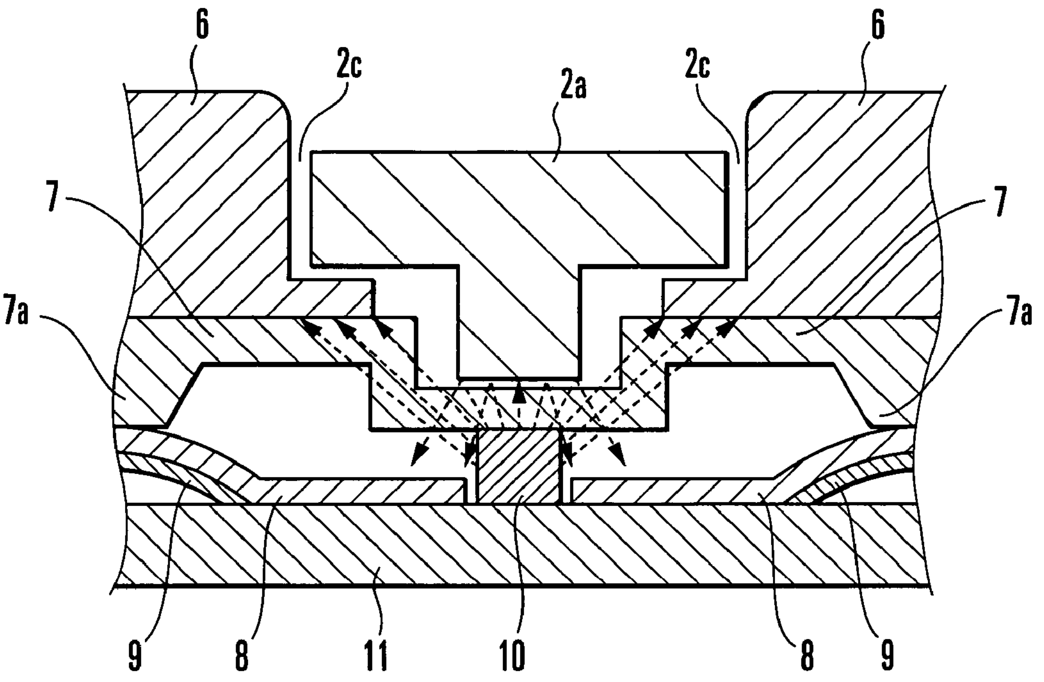
FIG. 2 is an enlarged sectional view of the portion near the operation button portion of FIG. 1.
Figure 3C:
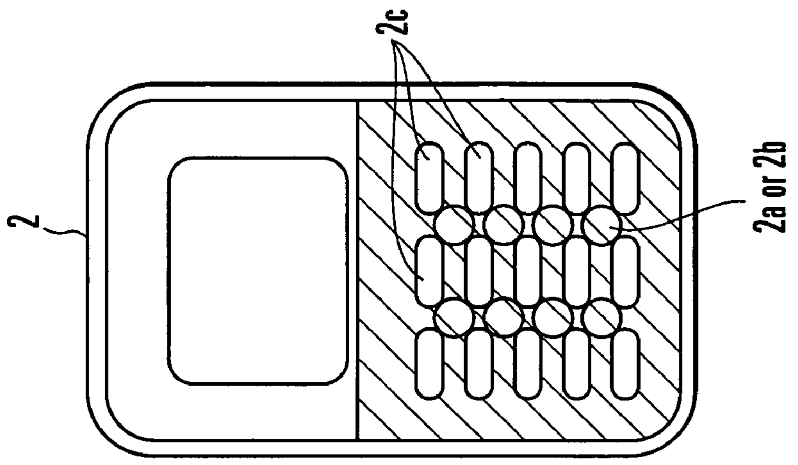
FIGS. 3A, 3B, and 3C respectively show the front, side, and rear surfaces, respectively, of the front cover of the electronic device of the first embodiment shown in FIG. 1.
Figure 3B:
Figure 3A:
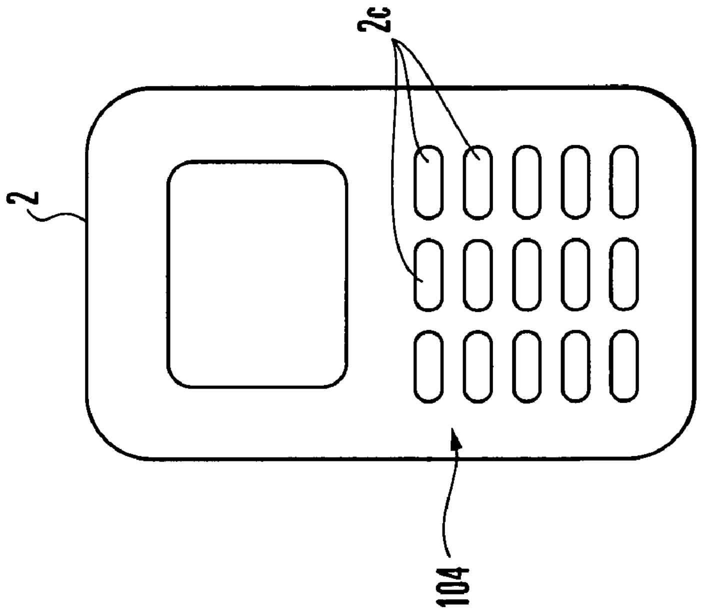
Figure 6C:
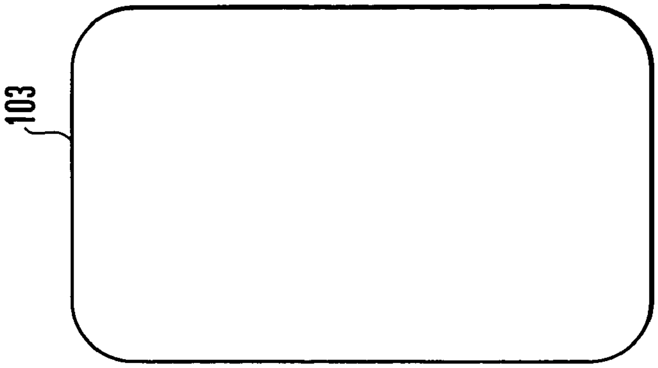
FIG.6C PRIOR ART
FIGS. 6A, 6B, and 6C respectively show the front, side, and rear surfaces, respectively, of a general portable electronic device.
Figure 6B:
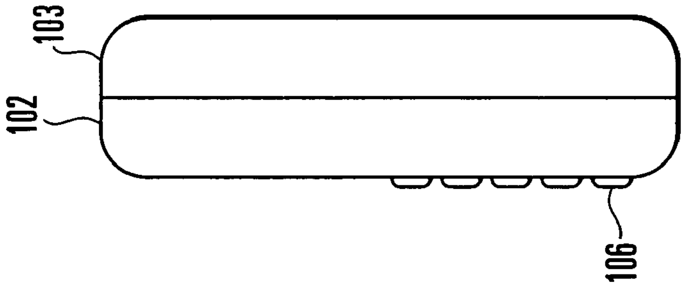
FIG.6B PRIOR ART
Figure 6A:
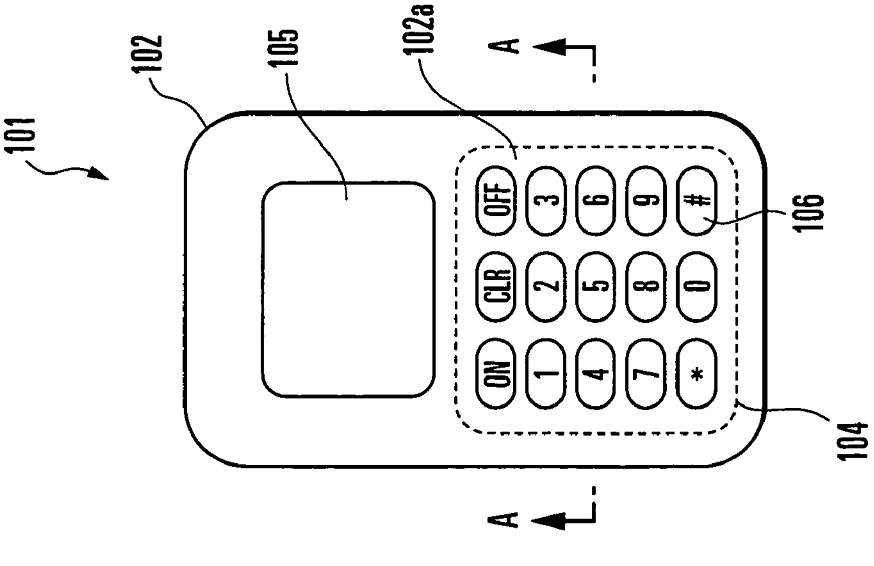
FIG.6A PRIOR ART
Figure 7:
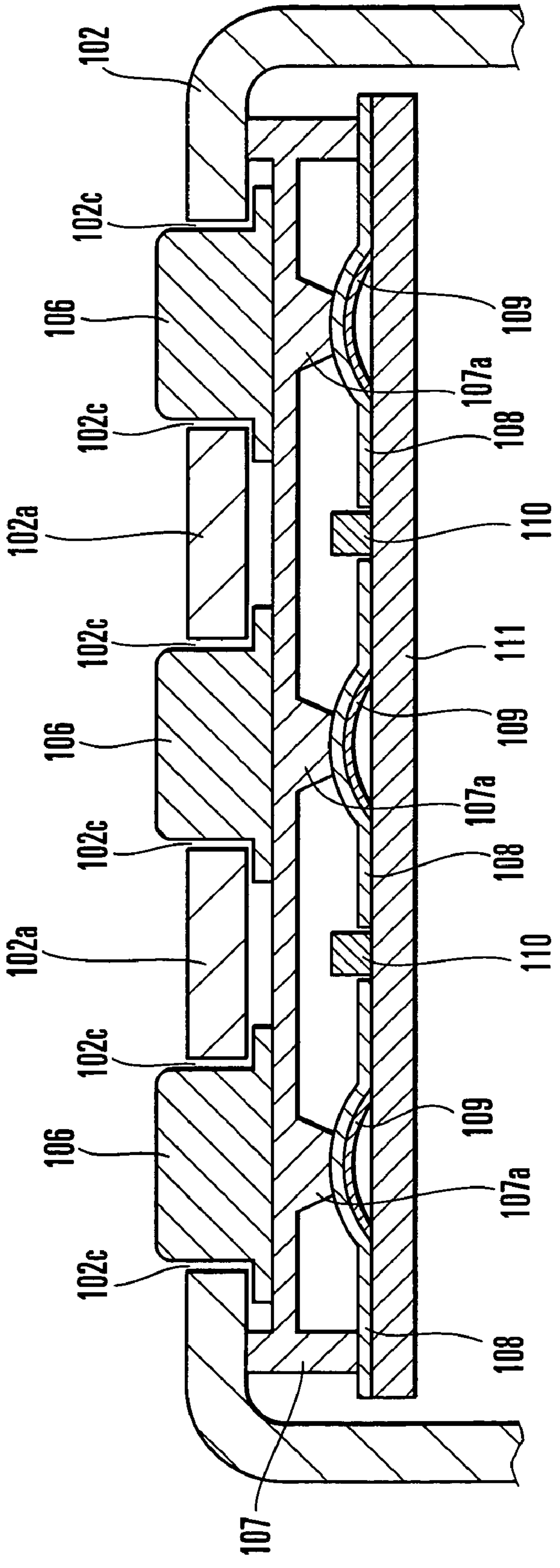
FIG. 7 PRIOR ART
FIG. 7 is a sectional view showing a portion near an operation button portion of the general portable electronic device.

FIG. 1 shows the first embodiment of the present invention. FIG. 1 shows the section taken along the same portion as the A-A section of FIG. 6A. FIG. 2 shows in enlargement a portion near a casing portion 2*a* in the vicinity of an operation button of FIG. 1. FIGS. 3A to 3C show the appearance of a front case 2.

As shown in FIGS. 1 and 2, portions between openings 2*c* of the front case 2 form the casing portions 2*a* each having a rectangular rib 2*aa*. For this reason, as compared to the conventional flat casing portions 102*a*, the casing portions 2*a* have a high rigidity and accordingly do not deform easily. As the casing portions 2*a* have the rectangular ribs 2*aa* at their lower portions, a rubber sheet 7 has recesses 7*b* at its portions immediately under the ribs 2*aa* so that the rubber sheet 7 does not interfere with the ribs 2*aa*.

Other constituent portions are similar to those of the light emission structure of the electronic device in an ordinary portable communication terminal. A detailed description of the similar constituent portions will be omitted.

When the casing portion 2*a* having the rib 2*aa* is pressed at immediately above the rib 2*aa*, as the casing portion 2*a* does not deform easily, it does not come into contact with an operation button 6. Even if it should deform, as the casing portion 2*a* does not subside largely, it does not come into contact with the operation button 6. Therefore, even when the casing portion 2*a* is pressed erroneously, the portable communication terminal does not operate erroneously.

In the light emission structure of the first embodiment, if an LED 10 is arranged immediately under the rib 2*aa*, even when the casing portion 2*a* deforms, the rib 2*aa* comes into contact with the LED 10 to suppress subsidence of the casing portion 2*a*. In this case, the pressing force applied to the casing portion 2*a* through the rubber sheet 7 is also transmitted to the LED 10 immediately under the casing portion 2*a*. As the pressing force is absorbed by the elastic rubber sheet 7, the LED 10 will not be damaged.

The light emission state of the LED 10 will be described with reference to FIG. 2.

Broken arrows in FIG. 2 indicate the emitting directions and refracting directions of light when an LED 10 emits light.

The light from the LED 10 is transmitted through the transparent rubber sheet 7 directly to illuminate the operation button 6. Alternatively, the light from the LED 10 is reflected by the rib 2*aa* of the casing portion 2*a* and returned to a light-diffusing sheet 8 once and then reflected by the light-diffusing sheet 8 again to illuminate the operation button 6.

Illumination of the operation buttons 6 when the lower surface of the front case 2 is gloss-finished will be described with reference to FIGS. 3A, 3B, and 3C.

The lower side of the front case 2 which corresponds to an operating portion 104 having the plurality of openings 2*c* where the operation buttons 6 are to be inserted is gloss-finished, as shown in FIG. 3C. Gloss finishing covers the entire lower surface of the operating portion 104 of the front case 2 to include the ribs 2*aa* of the casing portions 2*a*.

When gloss finishing is performed, the reflectance of light increases and light from the LED 10 can be reflected easily. Then, light can propagate within a wider range in the electronic device.

Therefore, the problem of the so-called light nonuniformity or a difference in emitted light brightness among the operation button 6 can be solved.

The example of the gloss finishing method includes plating and metal vapor deposition. Plating includes electric plating, molten plating, metal spraying, and the like. Gloss finishing can be performed on part of the lower surface of the front case 2.

Second Embodiment

Figure 4:
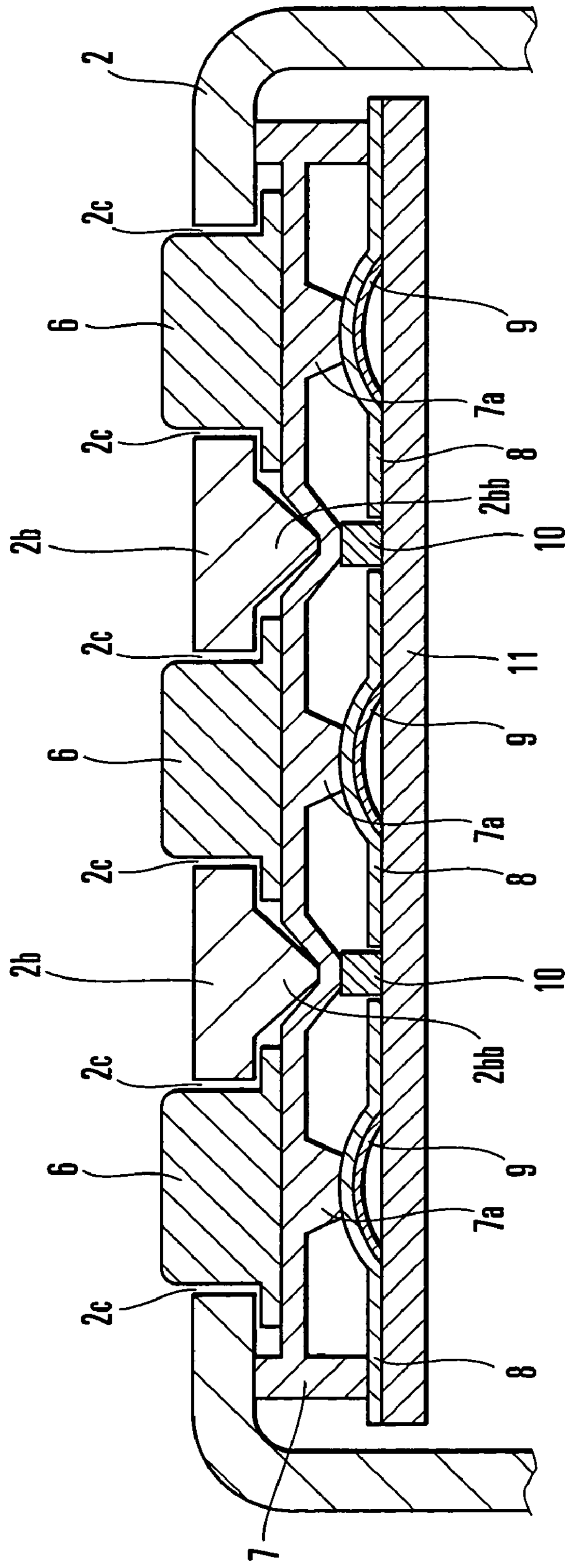
FIG. 4 is a sectional view of a portion near an operation button portion of an electronic device according to the second embodiment of the present invention.
Figure 5:
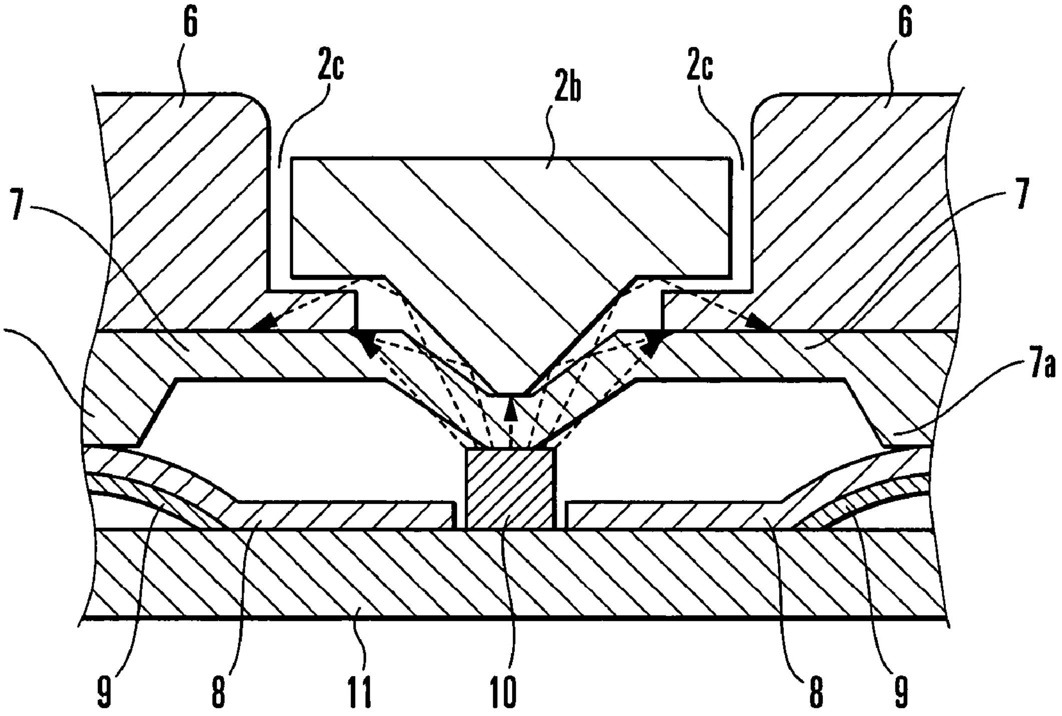
FIG. 5 is an enlarged sectional view of the portion near the operation button portion of the electronic device of FIG. 4.

FIGS. 4 and 5 show a portable communication terminal according to the second embodiment of the present invention. The section of FIG. 4 is taken along the same portion as the A-A section of FIG. 6A. FIG. 5 shows in enlargement that portion of a front case 2 which is near a casing portion 2*b* where a rib 2*bb* is formed.

In the portable communication terminal of FIG. 4, the circular conical ribs 2*bb* replace the rectangular ribs 2*aa* of the casing portions 2*a* of the first embodiment described above. Accordingly, a rubber sheet 7 is bent along the ribs 2*bb* of the casing portions 2*b* of the front case 2 to abut against LEDs 10.

Other constituent portions are similar to those of the first embodiment. In FIGS. 4 and 5, the similar constituent portions are denoted by the same reference numerals as in the first embodiment and a detailed description thereof will be omitted.

The casing portions 2*b* have the circular conical ribs 2*bb*. Therefore, when compared to the conventional flat casing portions 102*a* having no ribs, the casing portions 2*b* have a higher rigidity and can hardly deform.

When the casing portion 2*b* having the rib 2*bb* is pressed right above the rib 2*bb*, as the casing portion 2*b* can hardly deform, it does not come into contact with an operation button 6. Even if it should deform, as the entire casing portion 2*b* subsides to come into contact with the rubber sheet 7, the pressing force applied from above the casing portion 2*b* is transmitted to the rubber sheet 7. Therefore, even when the casing portion 2*b* is pressed erroneously, the portable communication terminal does not operate erroneously.

The light emission state of the LED 10 will be described with reference to FIG. 5. Broken arrows in FIG. 5 indicate the emitting directions and refracting directions of light when the LED 10 emits light.

As the casing portion 2*b* has the circular conical rib 2*bb*, when the LED 10 emits light, the light from the LED 10 is not shielded by the rib 2*bb* of the casing portion 2*b* but transmitted through the transparent rubber sheet 7 to propagate to the operation button 6. Consequently, when compared to the rectangular rib 2*aa* of the first embodiment, with the rib 2*bb*, the operation button 6 can be illuminated more brightly.

As shown in FIG. 5, the light from the LED 10 is reflected and diffused by the circular conical rib 2*bb*. Therefore, the light from the LED 10 does not irradiate one portion concentratedly but can propagate farther and uniformly in the electronic device.

Furthermore, in the same manner as in the first embodiment, when gloss finishing is performed, the light from the LED can be readily reflected by the front case or rib. Thus, the light can propagate within a wider range in the electronic device.

As described above, in the portable communication terminal according to this embodiment, even when the casing portion 2*b* is pressed, as the casing portion 2*b* has a high rigidity, it does not come into contact with the casing portion 2*b*.

Therefore, even when the casing portion 2*b* is pressed erroneously, the portable communication terminal does not operate erroneously.

As the casing portion 2*b* forms a circular cone, light from the LED 10 is not shielded by the casing portion 2*b* but transmitted through the transparent rubber sheet 7 to propagate to the operation button 6.

Furthermore, when the lower surface of the front case 2 is gloss-finished, if the ribs form circular cones, light from the LEDs 10 diffuses. Thus, the light from the LEDs 10 can propagate within a wider range.

Therefore, an operation button placed at a position far from the LED can be illuminated. As the light from the LED does not concentrate but is diffused, a difference in brightness among the operation buttons can be prevented. Consequently, even when the number of LEDs to be used in an electronic device or the like is decreased, the respective operation buttons can be illuminated uniformly.

The portable communication terminal of the present invention has been described above by way of preferred embodiments. Note that the light emission structure of the present invention is not limited to the embodiments described above, but various changes and modifications can naturally be made within the scope of the present invention.

For example, the portable communication terminal according to the present invention is not limited to a case wherein the terminal is to be used in a general electronic device, but can naturally be applied to all electronic devices, e.g., a portable telephone or electronic watch, that needs button operation in the darkness.

As described above, with the portable communication terminal of the present invention, the light emission structure can be manufactured in the portable telephone manufacturing industry and the like, and the portable communication terminal including the light emission structure can be used in the industry. Therefore, the portable communication terminal of the present invention has a high industrial applicability.

As described above, in the portable communication terminal of the present invention which comprises a front case having a plurality of openings, a plurality of operation buttons which are placed in the respective openings to operate the portable communication terminal, a rubber sheet which fixes the operation buttons from a lower side, and a built-in light-emitting diode which illuminates the operation buttons, a rib is formed on the lower surface of a casing portion between the openings of the front case, and the rubber sheet is interposed between the rib and light-emitting diode. Even when the casing portion is pressed, the operation button does not operate erroneously. Even when the casing portion between the openings is pressed erroneously, as the rib is formed on the lower side of the casing portion, the front case can hardly deform. Even if the front case should deform, as the casing portion does not subside largely, it does not come into contact with the operation button. Therefore, even when the casing portion between the openings is pressed erroneously, neither the operation button reacts, nor the portable communication telephone operates erroneously.

According to the portable communication terminal of the present invention, the light-emitting diode is provided right under the rib through the rubber sheet. When the casing portion between the openings is erroneously pressed, the rib comes into contact with the LED through the rubber sheet, so that the casing portion is supported by the LED. In this case, as the LED comes into contact with the casing portion through the elastic rubber sheet, a large pressing force that might damage the LED does not act on the LED.

According to the portable communication terminal of the present invention, at least part of the lower surface of the front case has a high reflectance. When the LED emits light, light irradiating the lower surface of the front case can be readily reflected. Therefore, the light propagates within a wider range in the portable communication terminal to illuminate the respective operation buttons uniformly and brightly.

According to the portable communication terminal of the present invention, the reflectance is increased by plating or metal deposition. When plating is to be employed, electric plating, molten plating, or metal spraying is performed. When metal vapor deposition is to be employed, a thin metal film is deposited on the lower surface of the front case. Thus, the reflectance of light can increase.

According to the portable communication terminal of the present invention, as the rib is circular conical, light from the LED is not shielded by the rib. As the rib is circular conical, when the light from the LED irradiates the inclined surface of the rib, the light is diffused and reflected by the inclined surface. Consequently, the light from the LED can propagate within a wide range in the portable communication terminal.

According to the portable communication terminal of the present invention, the portable communication terminal is a portable telephone. If the portable communication terminal is applied to a portable telephone, any erroneous operation of the portable telephone can be prevented. Also, the respective operation buttons of the portable telephone can be illuminated uniformly and clearly.

As has been described above, according to the characteristic feature of the communication terminal device of the present invention, the rigidity of the front case is increased by forming ribs on the lower side of the front case between openings. Then, even when the front case is pressed at right above a rib, the front case can hardly deform. Even if the front case deforms and its casing portion subsides, the pressing force acting on the rib is transmitted to the rubber sheet, and the front case does not come into contact with the operation button. Therefore, even when a casing portion between the openings is pressed erroneously, the operation button will not be pressed to erroneously operate the portable communication terminal.

According to the present invention, the flat portion and the ribs on the lower surface of the front case are gloss-finished by plating or metal vapor deposition, so that the reflectance of the front case increases. Then, light from the LEDs can propagate within a wide range, and the so-called light nonuniformity among the respective operation buttons can solved.

According to the present invention, since the ribs are circular conical, light from the LEDs is not shielded by the ribs but diffused by the inclined surfaces of the circular conical ribs. Therefore, the respective operation buttons can be illuminated uniformly and clearly.

What is claimed is:

1. A portable communication terminal characterized by comprising:

a front case having a plurality of openings;

a plurality of operation buttons which are placed in the respective openings to operate the portable communication terminal;

a rubber sheet which fixes said operation buttons from a lower side; and a light-emitting diode which illuminates said operation buttons, wherein a rib is formed on a lower surface of a casing portion between the openings of said front case, said rubber sheet being interposed directly between said rib and said light-emitting diode.

2. A terminal according to claim 1, wherein said light-emitting diode (10) is arranged right under said rib (2*aa*, 2*bb*) through said rubber sheet (7).

3. A terminal according to claim 1, wherein a reflectance of at least part of a lower surface of said front case (2) is increased.

4. A terminal according to claim 3, wherein the reflectance is increased by plating or metal vapor deposition.

5. A terminal according to claim 1, wherein said rib (2*bb*) is circular conical.

6. A portable telephone communication terminal comprising the portable communication terminal of claim 1 in a portable telephone.

7. A portable communication terminal comprising:

a front case having plural openings;

plural operation buttons each within a respective one of said plural openings to operate the portable communication terminal;

a flexible sheet below and supporting said operation buttons;

a light-emitting diode which illuminates said plural operation buttons, a rib extending from a lower surface of a portion of said front case between two of said plural openings, said flexible sheet being between said rib and said light-emitting diode, wherein the flexible sheet is rubber and comprises a recess accommodating said rib.

8. The terminal according to claim 7, wherein said light-emitting diode is directly under said rib.

9. The terminal according to claim 8, further comprising a light diffusing sheet, said flexible sheet being between said plural operating buttons and said light diffusing sheet.

10. The terminal according to claim 9, wherein light from said light emitting diode directly illuminates one of said plural operating buttons and indirectly illuminates said one of said plural buttons by reflecting off said light diffusing sheet.

11. The terminal according to claim 10, wherein the reflectance is increased by plating or metal vapor deposition.

12. The terminal according to claim 7, wherein said rib is circular conical.

* * * * *